United States Patent [19]

Chraplyvy et al.

[11] Patent Number: 5,327,516
[45] Date of Patent: Jul. 5, 1994

[54] OPTICAL FIBER FOR WAVELENGTH DIVISION MULTIPLEXING

[75] Inventors: Andrew R. Chraplyvy, Matawan; Robert W. Tkach, Little Silver; Kenneth L. Walker, New Providence, all of N.J.

[73] Assignee: AT&T Bell Laboratories, Murray Hill, N.J.

[21] Appl. No.: 69,962

[22] Filed: May 28, 1993

[51] Int. Cl.⁵ .................................. G02B 6/02
[52] U.S. Cl. .................................. 385/123; 385/100; 385/128
[58] Field of Search ............... 385/100, 106, 112, 128, 385/123

[56] References Cited

PUBLICATIONS

Marcuse, D., et al., "Effect of Fiber Nonlinearity on Long-Distance Transmission", *J. Lightwave Technology*, vol. 9, No. 1, pp. 121–128, Jan. 1991.

Reed, W. A., et al., "Tailoring Optical Characteristics of Dispersion-Shifted Lightguides for Applications near 1.55 μm", *AT&T Technical Journal*, vol. 65, Issue 5, (1986), pp. 105–122.

*AT&T Lightguide Cable*, Issue 9, Dec., 1990, pp. 14, 19, 21.

Primary Examiner—Frank Gonzalez
Attorney, Agent, or Firm—George S. Indig

[57] ABSTRACT

Optical fiber including a core and a clad suitable for use in wavelength division multiplex systems. The fiber can have an attenuation at 1550 nm less than 0.25 dB/km, a cut off wavelength of less than 1.40 μm, and a dispersion slope less than 0.15 ps/(nm²-km).

11 Claims, 2 Drawing Sheets

OPTICAL FIBER FOR WAVELENGTH DIVISION MULTIPLEXING

FIELD OF THE INVENTION

Design of optical fiber suitable for wavelength division multiplex operation.

DESCRIPTION OF THE PRIOR ART

Many advanced optical fiber communication systems now being installed and to be installed are based on a remarkably sophisticated commodity—the dispersion shifted fiber (DSF). This fiber provides both for high signal capacity and low insertion loss. Years of development have culminated in a fiber with experimentally demonstrated pulse capacity of 20Gbit/sec and with attenuation in the 0.22–0.25 db/km range.

The following specification sheet is representative of state-of-the-art DSF.

| | Specifications |
|---|---|
| Attenuation at 1550 nm | 0.22–0.25 dB/km |
| Attenuation at 1310 nm | 0.45–0.50 dB/km |
| Mode field diameter | 8.4 ± 0.6 micron |
| Core eccentricity | Less than or equal to 0.8 micron |
| Cladding diameter | 125 ± 2.0 micron |
| Cut-off wavelength | <1.30 micron, (2m reference length) |
| Dispersion | <3.5 ps/nm-km over 1525–1575 nm |
| Dispersion slope | <0.095 ps/nm$^2$-km maximum |
| Macrobending | <0.5 dB @ 1550 nm one turn, 32 mm |
| | <0.1 dB @ 1550 nm 100 turns, 75 mm |
| Coating diameter | 250 ± 15 micron |
| Proof test | 50 kpsi minimum (high proof test levels available upon request) |
| Reel length | 2.2, 4.4, 6.4, 10.8, 12.6 and 19.2 km |

DSF design, in providing, for operation at $\lambda=1550$ nm, takes advantage of this lowest-loss window outside the water absorption peak. Bandwidth is maximized by a fiber design resulting in a value of waveguide dispersion to shift the zero-dispersion wavelength, $\lambda_0$, to 1550 nm from its composition dictated value of 1310 nm.

A recent development takes advantage of this fiber design. To a considerable extent, new fiber optic systems depend on direct optical amplification, rather than the signal regeneration (of the repeaters) that was used in earlier systems. The erbium doped fiber amplifier (EDFA), today's most highly developed optical amplifier, operates most effectively over the same wavelength range for least insertion loss—$\lambda \approx 1.55$ $\mu$m.

Further signal capacity is to be realized by wavelength division multiplexing (WDM). Here provision is made for multiple channels—for multiple carrier wavelengths. Direct optical amplification, with its ability to amplify all channels simultaneously, has made acceptance of WDM a more realistic probability.

Using already-installed non-shifted fiber, it has been demonstrated that use of four channels with channel-to-channel separation of ~2 nm, operating in the 1.55 $\mu$m wavelength range, capacity may be increased four-fold over single channel operation —to $4 \times 2.5$Gb = 10Gb.

Recently installed WDM systems and those now being installed are to operate at at least twice the capacity for unshifted fiber in initial operation or upon contemplated upgrading—at at least $4 \times 5$Gb = 20Gb. This expected capacity improvement is attributed to use of DSF.

Terminology

Fiber characteristics—manufacturing specification tolerances permit local deviation from nominal value, which may be unacceptable in an overall system. Fiber characteristics are average values meeting system requirements. They are measured on commodity fiber in the form marketed—i.e., on a fiber of reel length of at least 2.2 km. With emphasis on long continuous span lengths, reels of 6 km and larger are becoming common, and fiber characteristics are preferably as measured over such reel length.

Nominal values—these are the specification values, e.g., as tabulated under "Description of Prior Art".

Tolerance (from nominal values)—e.g., as represented on that same table, allow for local deviations from nominal value—likely greater or smaller (±). This is the permitted deviation for any portion of the fiber. Specification tolerances may be broader than the range of "fiber characteristics".

DSF—fiber for which the chromatic dispersion null point, $\lambda_0$, is at the nominal value of 1.55 $\mu$m. Specification tolerance is typically 0.01 $\mu$m. Specification requirements in terms of dispersion and dispersion slope are equivalent (so that the tabulated dispersion value $\leq 3.5$ ps/nm-km over 1525–1575 nm—requires a dispersion null point, $\lambda_0 = 1.55 \pm 0.01$ $\mu$m (i.e. chromatic dispersion at $\lambda = 1.55$ $\mu$m $\leq$ ps/nm-km).

WDM—Wavelength Division Multiplex, unless otherwise specified, means operation with at least 4 channels, separated one from the other by 1.5 nm or greater. Contemplated WDM systems are capable of operating at at least 5Gbit/sec per channel with a minimum repeaterless span length of 360 km (i.e., over a span without signal regenerators). Contemplated WDM systems are likely to use optical amplification, with amplifiers at substantial spacings—spacings of ~100 km or even 120 km or more.

Dispersion—Unless otherwise stated this term refers to chromatic or "linear" dispersion. It is this quantity which is addressed by DSF. In accordance with convention, the sign of the dispersion is positive for the case in which short wavelength radiation has increased velocity. (Unshifted silica fiber of $\lambda_0 = 1.31$ $\mu$m has a dispersion of ~ +17 ps/nm-km at a carrier wavelength of 1.55 $\mu$m.)

Self-Phase Modulation (SPM)—This non-linear effect leads to spectral broadening of magnitude which increases with increasing (linear) dispersion. Since generation of new wavelengths is random in time, it is not completely compensated by simple chromatic compensation.

SUMMARY OF THE INVENTION

It is now found that contemplated WDM (four-channel) operation is essentially precluded by use of DSF. DSF already in place is found to be limited either to single channel operation or to use in WDM systems which are limited in span length or number of channels. In accordance with the invention, contemplated WDM operation will be achievable by substitution of a new fiber structure—as here designated, by substitution of "WDM Fiber" (WDMF) for DSF.

Briefly stated, the advance depends upon the observation that operation using DSF precludes contemplated WDM operation. Interactions between channels by four photon mixing severely restricts system design as well as operating characteristics. Introduction of a small critical degree of linear dispersion produces a sufficient phase mismatch to avoid the nonlinear effect. Maintaining linear dispersion within the limits prescribed permits full contemplated WDM operation.

F(G. 2 is a perspective view of a WDM Fiber, dual coated in accordance with conventional practice.

Figure 3:
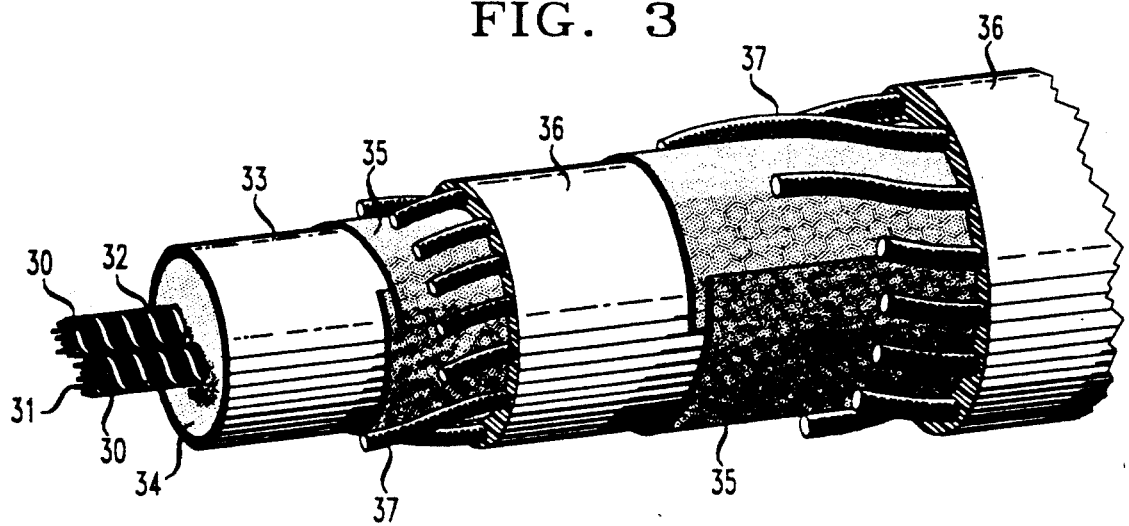

FIG. 3 is a perspective view one form of cable structure containing grouped WDM Fibers.

Figure 4:
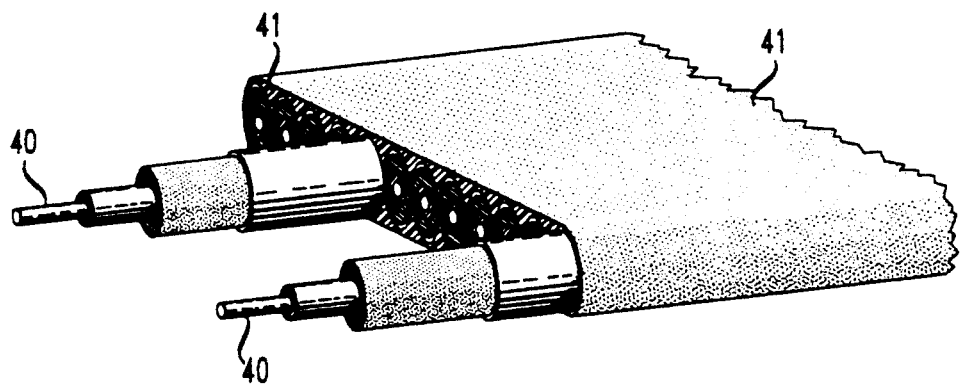

FIG. 4 is a perspective view of an array—an AccuRibbon® parallel array—containing 12 WDM Fibers.

Figure 5:
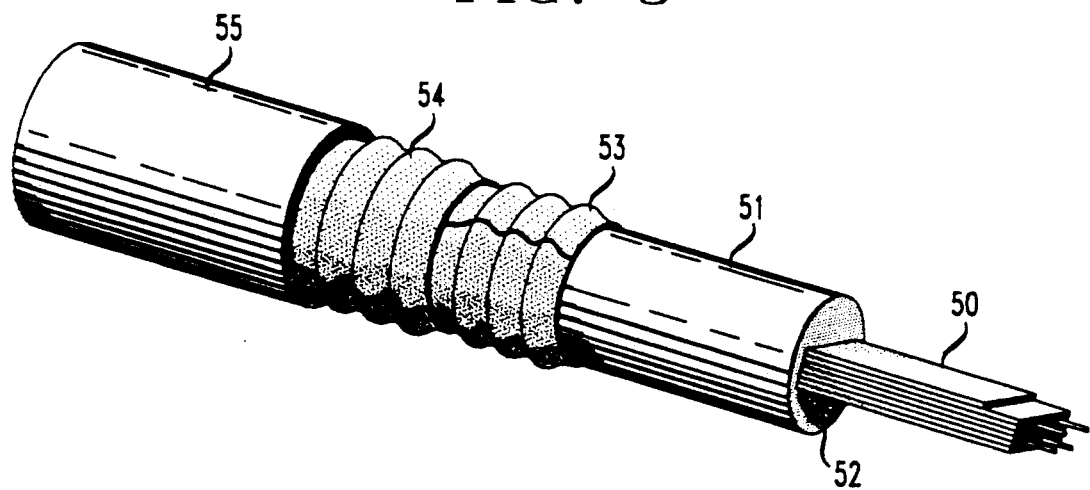

FIG. 5 is a perspective view of a cable containing parallel arrays of WDM Fibers.

DETAILED DESCRIPTION

General

It has now been found that the ultimate purpose to be served by DSF is thwarted by the very perfection with which chromatic dispersion is eliminated. The permitted dispersion tolerance, of <3.5 ps/nm-km over the wavelength range $\lambda = 1525-1575$ nm, of the DSF Specification Table is, in itself, assurance of sufficient non-linear dispersion to cause difficulty in WDM operation. The limiting form of non-linear dispersion—4-photon mixing (4PM)—is described in the literature, see, article by D. Marcuse, A. R. Chraplyvy and R. W. Tkach entitled "Effect of Fiber Nonlinearity on Long-Distance Transmission", Journal of Lightwave Technology, vol. 9, no. 1, January 1991, pp. 121–128. For most purposes 4PM has been of academic interest only. The cited paper is reasonably representative in examining systems of span lengths of 7500 km. In-place systems (based on usual span lengths of DS Fiber, which are much shorter), as well as continued sale and installation of DSF specifically for WDM operation is consistent.

It is possible to lessen limitations imposed by 4PM by sophisticated circuit design. Attention to channel spacings and modulation formats may permit continued use of DSF for WDM systems of severely reduced capability—for limited numbers of channels and for limited distances. WDM systems now contemplated, using simple, straight-forward design, will be permitted with WDMF replacing DSF. Use of WDMF will permit sought-for capability of e.g., four-channel operation, per channel capacity of at least 5Gb/sec, repeaterless span lengths of 360 km and more, with channel spacings of from 1.0 nm–2.0 nm. System designers will readily acknowledge and implement the teaching.

The teaching is somewhat simplistic, and depends on background knowledge of the skilled reader. To be rigorous, 4PM appears as a fluctuating gain or loss—as a power penalty—due to constructive and destructive interference entailing signals of different channels. 4PM is not a noise source. Since the effect is a signal distortion, with amplitude of some portions increased and some decreased, the effect may not be redressed. Since the magnitude of 4PM is power dependent, the effect may be lessened by reducing launch power. For a given fiber span length, the effect may be lessened, by increasing the number of amplifiers to permit a decrease in launched powers. As defined under "Terminology", WDMF permits use of amplifiers, each operating at a power level precluded by DSF for contemplated WDM. For these purposes, the inventive advance is defined in terms of fiber of design to permit amplified spacings of 120 km with one or more amplifiers operating at a launch power level of 8 dBm. (All of this is in terms of an expected loss budget including splice losses, aging effects, etc., of 33 dB for the interamplifier spacing.)

The invention is described in terms of WDMF with capability to satisfy high level expectations of the system designer—expectations associated with WDM, and now shown to be precluded with DSF. Description here is of capability, i.e., of operating requirements beyond the capability of DSF in accordance with usual design criteria. There is no requirement that this fiber capability be fully utilized in each and every installation. The invention concerns fiber of capability which may or may not be used in initial or even in contemplated upgraded operation.

WDM Fiber Specifications

A specification table for the inventive fiber has been developed. It is in the same terms, and may be compared item-by-item with the DSF specification included under "Description of the Prior Art". This set of specifications has been found adequate for fiber of contemplated WDM systems. (See co-filed U.S. application Ser. No. 08/069,952) (still pending) It is not intended to define the entire range of acceptable WDMF characteristics either for such contemplated systems or for other systems of lesser or greater demand.

| | WDM |
| --- | --- |
| Attenuation attenuation at 1550 nm | 0.22–0.25 dB/km |
| Attenuation at 1310 nm | 0.45–0.50 dB/km |
| Mode field diameter | 8.4 ± 0.6 micron |
| Core eccentricity | Less than or equal to 0.8 micron |
| Cladding diameter | 125 ± 2.0 micron |
| Cut-off wavelength | <1.30 micron, (2m reference length) |
| Dispersion | ≧ +2 ps/nm-km @ 1550 nm |
| Dispersion slope | <0.095 ps/nm$^2$-km maximum |
| Macrobending | <0.5 dB @ 1550 nm one turn, 32 mm |
| | <0.1 dB @ 1550 nm 100 turns, 75 mm |
| Coating diameter | 250 ± 15 micron |
| Proof test | 50 kpsi minimum (high proof test levels available upon request) |
| Reel length | 2.2, 4.4, 6.4, 8.8, 10.8, 12.6 and 19.2 km |

For the purpose of this illustration, only the value of dispersion is changed from the values specified for DSF in the illustrative table presented in the "Description of the Prior Art". This value must differ sufficiently from that specified for DSF to avoid 4PM. The corresponding Fiber Characteristic, defined in terms of average value for a reel—for a minimal length reel of 2.2 km or preferably ≧6 km—is prescribed as within the limits of 1 and 4 ps/nm-km.

Design variations, e.g., to satisfy other permitted values of dispersion, are considered within the knowledge of the artisan.

Fiber Design

The same general principles used in design of DSF are applicable in the design of WDMF. The new fiber may be regarded as dispersion shifted to an imaginary carrier wavelength differing from the DSF wavelength. Specification requirement of 2 ps/nm-km may be regarded as corresponding with that of a signal wavelength $\lambda_s = 1550$ nm $\pm 25$ nm. Any desired value of dispersion corresponds with that of a fiber design having a dispersion null point at some specified noncarrier wavelength.

Design entailing specification of core diameter as well as core and clad doping levels to assure needed delta values for the specified dispersion is well known. The requirements for WDM are met by either positive or negative dispersion. For practical reasons, work to date has concentrated on positive values of dispersion. Negative dispersion, for given fiber design requires further decreased core diameter and increased dopant levels. Both are likely to increase attenuation. In addition, it may in the future, become desirable to add high dispersion compensating fiber lengths to further reduce or even eliminate overall liner dispersion. See, U.S. patent application Ser. No. 07/978,002, filed (still pending). At the present high dispersion values, permitting convenient short lengths of compensating fiber, are negative.

Design considerations are with a view to the small but critical dispersion which is the primary differentiation over DSF. Other design criteria regarding, inter alia, macrobending loss, mode field diameter, etc., are generally consistent with design of state-of-the art fiber (e.g. DSF) and may change as advances are made. AT&T Technical Journal, vol. 65, Issue 5, (1986) at pp. 105-121 is representative. Fiber is silica based, and includes a germania-doped core, together with one or more cladding layers which may be of silica or may be down doped with fluorine. The overall 125 $\mu$m structure has a core of a diameter of about 6 $\mu$m. The index peak has a $\Delta n$ 0.013—0.015 with reference to undoped silica. Usual profile is triangular or trapezoidal, possibly above a 20 $\mu$m diameter platform of $\Delta n = 0.002$.

Design Example

An illustrative WDMF structure, yielding a dispersion of +2 ps/nm-km, has a germania doped core within a clad of index near or equal to that of undoped silica. Prevalent practice makes use of a stepped-index clad, with a "pedestal" of slightly increased index to enlarge the mode field. The structure has a graded index core attaining a doping level of 6.7 mol % corresponding with a $\Delta$ value of about 0.7%. The base of the core has a diameter of about 6.1 $\mu$m as centered on an 18 $\mu$m diameter pedestal which is germania doped to a level of about 0.05 mol %. The outside diameter of the clad fiber is about 125 $\mu$m.

Figure 2:
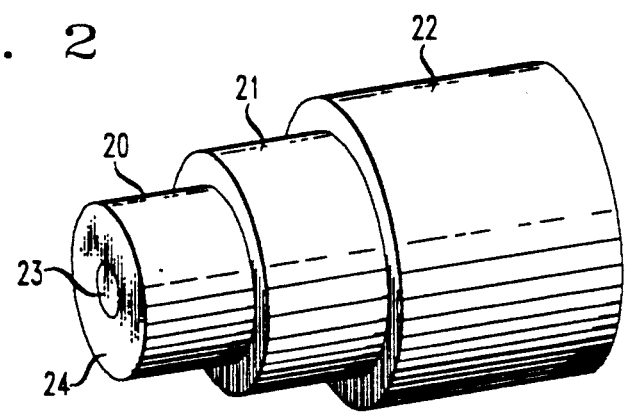

Detailed description of suitable procedures for fabrication is readily available. Preforms may be monolithic or composite. Core regions are likely formed by Modified Chemical Vapor Deposition or by one of the processes using soot chemistry—Outside Vapor Deposition or Vapor Axial Deposition. Known procedures, e.g. for cladding; for overcladding; for coating; for cabling are unaffected by the inventive fiber design. FIG. 2 shows a dual coated fiber; FIG. 4 shows a planar fiber array; FIGS. 3 and 5 show illustrative cable designs. All are suitable for implementation.

THE DRAWING

Figure 1:
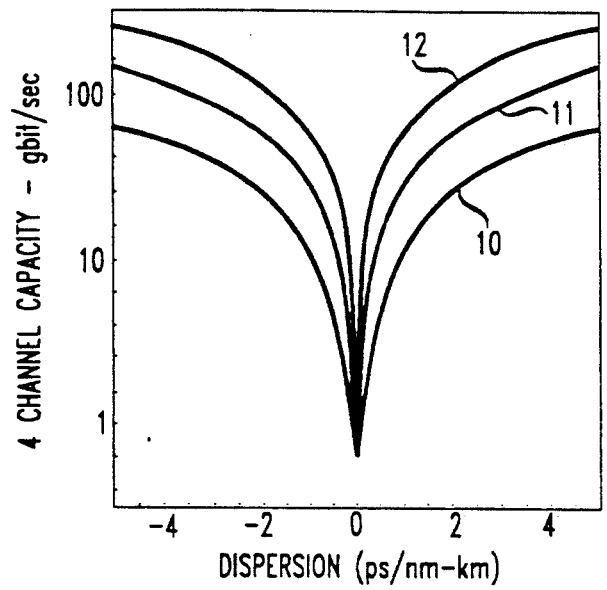
FIG. 1, on coordinates of signal capacity in Gbit/sec on the ordinate and linear dispersion in ps/nm-km on the abscissa, relates these properties for a four-channel WDM system for three different channel separations.

FIG. 1 shows the relationship between system capacity as limited by 4PM, and chromatic dispersion, for a four-channel, 360 km span (distance free of regenerators), WDM system using fiber of the invention (using WDMF). Three curves are presented: curve 10 corresponds with channel separation of 1 $\mu$m ($\sim$250GHz); curve 11 corresponds with 1.5 $\mu$m spacing ($\sim$200GHz); and curve 12 is for 2 $\mu$m spacing ($\sim$125GHz). A channel capacity of 2.5Gb/sec for the 1.5 $\mu$m spacing of curve 11 requires a per channel amplifier launch power of 11 dBm ($\sim$12.6 mw). 4PM, under contemplated conditions, is the real system limitation up to a four-channel capacity of about 75Gbit/sec, so that data presented may be regarded as aggregate system capacity at least to that value. Increasing channel separation results in reduced 4PM, and therefore in increased capacity, as shown.

Use of dispersion shifted fiber (use of DSF), with dispersion centering about the origin on the curve, under these conditions, restricts capacity to levels as small as 1Gbit/sec. Introduction of a dispersion as small as 1.5 ps/nm-km for WDMF permits 4-channel capacity of 20Gbit/sec with flexibility in launch power for the optical amplifiers. This capacity is likely sufficient for initial WDM systems. Expected future objectives of: 40Gbit/sec, 4-channel capacity; and 80Gbit/sec, 8-channel capacity, are permitted by the 2 ps/nm-km dispersion at 1550 nm as required in the WDM specification table.

FIG. 2 depicts a dual coated, WDMF 20, with primary coating 21 and secondary coating 22. Fiber 20 contains a core region 23 and clad region 24 of doping levels to yield an appropriate value of $\Delta_n$, which together with the size of core 23 determines waveguide dispersion to satisfy the inventive requirements.

FIG. 3 depicts one form of commercial cable (described in *AT&T Lightguide Cable*, issue 9, December 1990. It is shown as containing two bundles 30, each containing 12 color coded fibers 3 1, held together by an encircling yarn 32. Individual fibers 31 are of the general design of that of FIG. 2, but in this instance, include a tertiary coating provided with a color identifier. The structure is completed by cable filling compound 34, core tube 33, water blocking tape 35, polyethylene jacket 36 which is reinforced by steel wires 37, a second water blocking tape 35, and finally by outer polyethylene jacket 36 which is reinforced by steel wires 37.

FIG. 4 shows a commercially available parallel fiber array known as AccuRibbon ®. The structure provides for 12 fibers 40 and matrix material 41. FIG. 5 shows a cable containing grouped fibers, this time in the form of planar arrays 50. Cross-ply sheath 51 is filled with cable filling compound 52. The particular structure shown, an underwater armored cable, includes overwrappings in sequence constituting conductive shield 53, coated stainless steel protection layer 54, and bonded jacket 55.

We claim:

1. Article comprising at least one optical fiber suitable, for use in wavelength division multiplex systems, the fiber including a core and a clad, having an attenuation at 1550 nm $\leq$ than 0.25 dB/km, having a cut off wavelength of less than 1.40 $\mu$m and a dispersion slope less than 0.15 ps/(nm$^2$-km) characterized in that the absolute magnitude of the average chromatic dispersion at 1550 nm for a fiber length of at least 2.2 km is in the range of 1.5-4ps/nm-km.

2. Article of claim 1 in which the fiber is encompassed within a coating.

3. Article of claim 2 in which the fiber is encompassed within dual coatings including a primary coating in direct contact with the fiber and a secondary coating about the primary coating.

4. Article of claim 2 including a plurality of optical fibers within a sheathing, so defining a cable.

5. Article of claim 4 including grouped fibers.

6. Article of claim 5 in which a group is in the form of a planar array.

7. Article of claim 1 in which the sign of the average chromatic dispersion is positive.

8. Article of claim 1 in which the average chromatic dispersion is at least 2 ps/nm-km.

9. Article of claim 2 comprising reeled product.

10. Article of claim 9 consisting essentially of a reel of coated optical fiber 11. Article of claim 1 in which the dispersion slope is less than 0.095 ps/nm$^2$-km.

* * * * *